United States Patent
Brumagin et al.

[15] 3,689,049
[45] Sept. 5, 1972

[54] METHOD AND APPARATUS FOR SEPARATING METAL FROM DROSS

[72] Inventors: Thomas H. Brumagin, John M. Dickson, Harley E. Northrop, all of Westfield, N.Y. 14787; Stanley H. Brown, Newark, Ohio 43055; Lynn W. Campbell, Newark, Ohio 43055; Elmo W. Friesz, Newark, Ohio 43055

[73] Assignee: The Ajax-Newark, Inc. Westfield, N.Y.

[22] Filed: April 4, 1969

[21] Appl. No.: 813,645

[52] U.S. Cl. .................................. 266/37, 75/63
[51] Int. Cl. ........................................ C22c 21/00
[58] Field of Search ....... 266/37, 34 A; 75/24, 68, 63; 241/64, 65, 194; 164/260; 209/194, 195, 197

[56] References Cited

UNITED STATES PATENTS

| | | | |
|---|---|---|---|
| 1,908,104 | 5/1933 | Bell | 164/260 |
| 1,994,705 | 5/1935 | Hill | 164/260 |
| 2,040,167 | 5/1936 | Crosby | 75/61 |
| 2,195,217 | 3/1940 | Lindenbeager | 75/68 |
| 2,353,492 | 7/1944 | O'Connor | 164/260 |
| 2,496,863 | 2/1950 | Deschamps | 75/93 |
| 2,811,437 | 10/1957 | Fessler | 75/49 |
| 3,043,678 | 7/1962 | Lowry | 75/68 |
| 3,316,079 | 4/1967 | Grady | 75/24 |
| 3,417,930 | 12/1968 | Brumagin | 241/64 |
| 3,251,681 | 5/1966 | Wakamatsu et al. | 266/34 A |

FOREIGN PATENTS OR APPLICATIONS

| | | | |
|---|---|---|---|
| 481,322 | 2/1952 | Canada | 266/37 |
| 1,207,464 | 2/1960 | France | 266/34 A |

Primary Examiner—Gerald A. Dost
Attorney—J. D. Douglass

[57] ABSTRACT

A pot for receiving molten metal and slag, which may be aluminum and dross is spring supported on a frame which is provided with variable frequency means to vibrate it. The frame which supports the pot includes a sub-frame that holds the pot which is pivotally mounted in the spring supported frame with means for tilting the pot while it is being vibrated. The pot is vibrated in the upright and tilted position. The bottom of the pot is provided with a tap hole, from which the molten metal may be drained into a mold. It may also be tilted far enough to discharge the dross or slag from out of the top of the pot onto a comminutor and cooler. The removal of the molten metal enhances the subsequent cooling.

13 Claims, 2 Drawing Figures

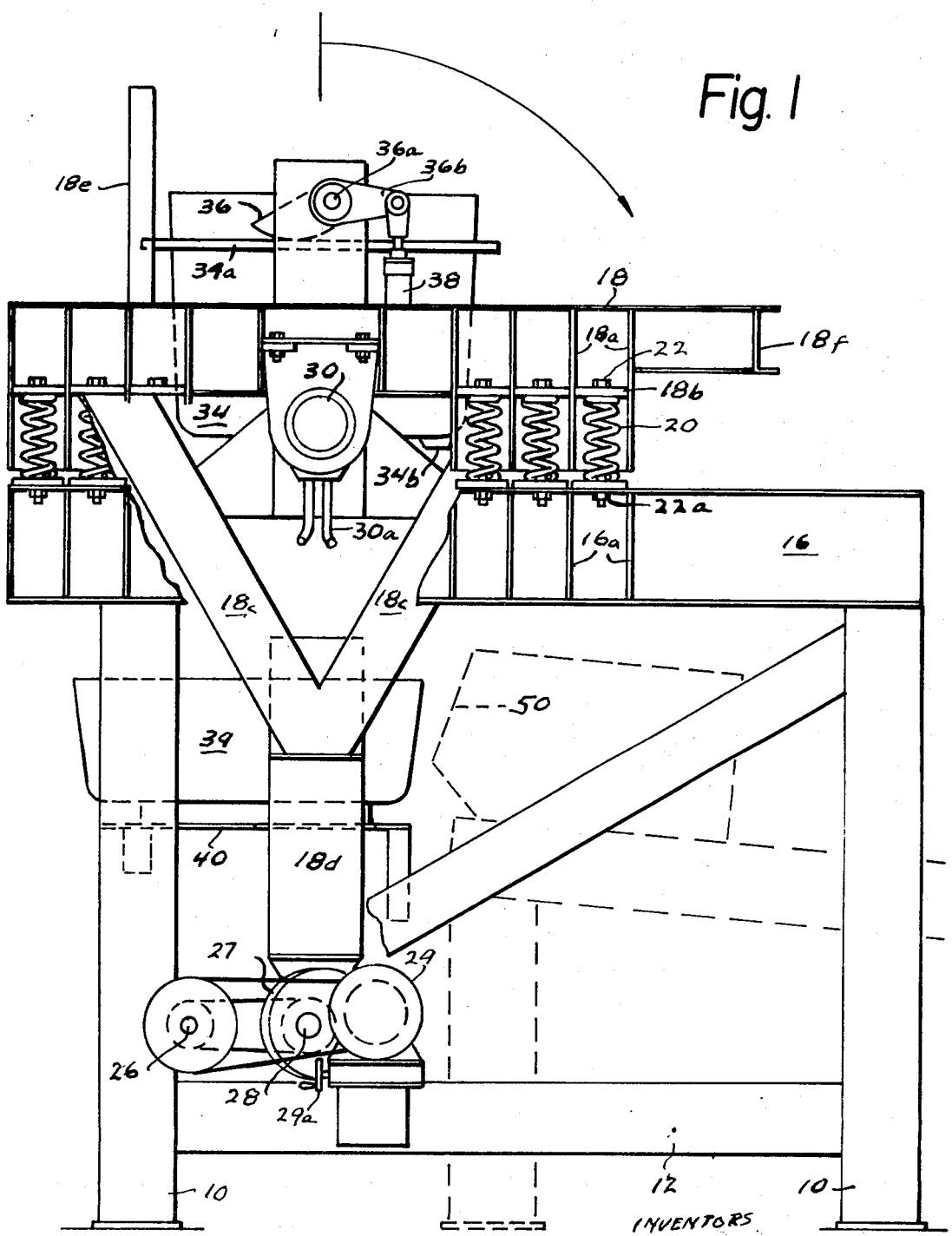

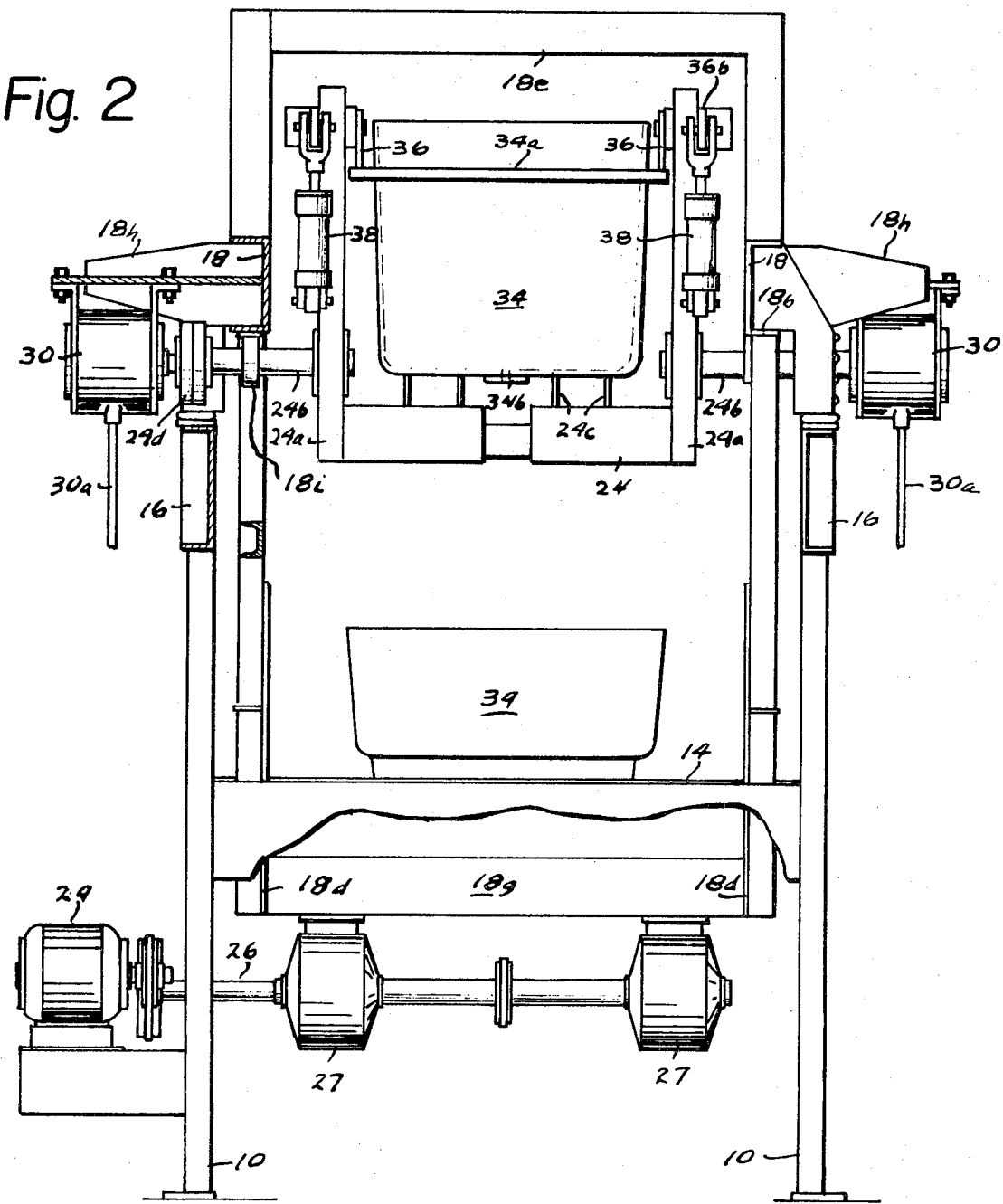

3,689,049

METHOD AND APPARATUS FOR SEPARATING METAL FROM DROSS

This invention relates to methods and apparatus for separating molten metal from dross and slag and cooling the dross.

As is well known to those versed in the art, the dross or slag from furnaces used for the manufacture of metals frequently consists of the oxides or fluxes used in the process along with some of the purified metal. The dross or slag has entrained therein a considerable amount of parent metal, which, unless it is recovered, results in a loss and also retards the cooling thereof. The above is particularly true in connection with the manufacture of non-ferrous metals and will be described in conjunction with the recovery of aluminum metal from dross, but is not limited thereto.

The particular invention has a definite use in conjunction with the "Apparatus for Treating Aluminum Dross", U.S. Pat. No. 3,417,930 of Dec. 24, 1968, in that it may be used preceding the above apparatus and provide for a greater recovery of metal and also operates in conjunction therewith to provide for a better distribution of the dross on said apparatus, increasing the efficiency of the treating thereof. Its use, however, is not limited to such a combination, because of its ability to effect the separation of molten metal.

Briefly, the invention contemplates placing the dross, as stated above, into a container which is vibrated to cause the heavier molten metal to settle to the bottom of the container where it may be tapped off. The dross may be decanted onto the comminutor and cooler of the above mentioned patent. The separation of the molten metal from the dross constitutes a preliminary cooling stage, reducing the cooling capacity required in the subsequent and final cooling stage by the above mentioned patented apparatus. The container may also be, and preferably is, tilted during the vibration to enable the position of the contents of the container to be changed, to increase the turbulence of the contents and cause the molten metal to run into one corner to facilitate tapping off. After the molten metal is tapped off, the tilting is continued at a controlled rate such that the dross or slag eventually is discharged gradually over the edge of the container into a suitable receptacle or onto the apparatus for further comminuting, as shown in the aforesaid patent. The vibration of the dross causes it to resist the tendency thereof to agglomerate and facilitates a preliminary spreading of the dross on the conveyor which speeds up the final breaking operation.

A particular feature of the invention resides in the application of vibratory forces to the container in such a manner that the contents partake of a very high degree of turbulence. This is effected by a compound action, the principal components of which are the vibration of the container which is resiliently supported laterally of the container. The container may be tilted during vibration to an angular position which provides a higher degree of agitation.

Preferably the rate of vibration may be varied to provide the desired degree of agitation which increases as the vibrating speed approaches the resonant frequency of the system.

Another feature of the invention resides in the fact that the container is quickly and easily positioned and removed from its vibratory support enabling it to be filled at the furnace, and transported to the support, and placed quickly in position with a minimum loss of time and heat. In the case of aluminum dross, the vibration serves to loosen the dross and allow the air to increase the exothermic reaction keeping the metal molten. The vibration together with the heat assist in coalescing the globules of molten metal.

In treating materials which do not have an inherent exothermic character, auxiliary heat may be supplied by burners or even in some instances additions of an exothermic material.

In addition, the vibratory structure is such that it facilitates the tapping of the container to remove the metal and the tilting thereof to discharge its contents without interfering with its vibration.

Still other advantages of the invention and the invention itself will become more apparent from the following description of an embodiment thereof, which description is illustrated by the accompanying drawings and forms a part of this specification.

In the drawings:

FIG. 1 is an elevational view of a mechanism embodying the invention; and

FIG. 2 is a view at 90° to FIG. 1.

Referring to the drawings, as best shown in the FIGS. a base or support is provided and includes a box frame comprised of four corner stanchions 10 supported on a foundation which may be concrete abutments and having lower stringers 12 on the sides extending between the stanchions near the bottom and stringers 14 extending between the stanchions at the front and rear, also near the bottom. The top of the stanchions 10 are bridged by channel-shaped beams 16 on top of which a vibratory frame 18 is resiliently supported. Additional strengthening of the top beam 16 at the points where the frame 18 is supported is provided by spaced plates 16a extending vertically between the top and bottom flanges.

The vibratory frame 18 provides means whereby a container or dross pot support and tiltable sub-frame is supported. It comprises a pair side members 18 fabricated from channel members and likewise reinforced by vertical plates 18a which are wider at their mid-portion and then extend downwardly from the reinforced base 18b to provide the sides of elongated vertical spring receiving pockets. The frame 18 is supported from the base by resilient means which, in this instance, are shown as heavy helical springs 20. The springs are captured by bolts 22 and 22a which secure the top ends to the reinforced base 18b and the bottom ends to the upper flanges of the channels 16. The frame 18 is thus resiliently supported from the support. If desired, the springs could be replaced by pistons and air cylinders and a source of air pressure or air cushions, whereby the spring rate could be controlled and the system tuned toward or away from resonance the desired degree, as is well known in the art.

The vibratory frame has secured thereto in balanced relation, preferably at the reinforment 18b, a pair of downwardly extending beams 18c which converge toward and join with each other spaced below the main frame beams 16 and then continue downward as a single member 18d. The two side frames may be tied together in fixed and spaced relation to each other in any suitable manner, bearing in mind that a tiltable dross pot support has to be supported between them and be able to be tilted to enhance the metal separation and also to discharge its contents. In the drawings a superstructure 18e ties the two frames together at a point above the innermost of the springs at one end, and between the ends of beam 18 which extend outward (to the right as viewed in FIG. 1) and by a channel beam 18f at the other end. The lower ends of the members 18d are tied together by a beam 18g upon which a pair of rotary vibrators 27 are mounted. The vibrators may be of the character shown in U.S. Pat. No. 1,999,213 or 2,097,347.

The vibrators are driven by a motor drive 29, which may be, and preferably does, include a variable speed transmission, controlled by a hand wheel 29a and mounted on the base stringer 12. The transmission is belted to a countershaft 26 which in turn is belted to the vibrator drive shaft 28. It will be noted that the vibrations from the vibrator are thus applied to the member 18d which is on a center line between resilient suspensions on opposite ends of the sub-frame, and because the member 18 is only supported by the springs, and is otherwise free, the movement applied to the frame 18 is primarily one of a vertical nature.

It is, therefore, apparent that, in its preferred from, the vibrating structure comprises a generally rectangular frame which carries the dross pot, and this frame is supported resiliently at four corners. Each side of the frame has a rigid downwardly extending side frame which ends mid-way between the resilient supports on a vertical line considerably spaced downward from the supports. The extremities of these extensions are rigidly tied together and have mounted thereon adjacent the end of each extension the rotary vibrator. These may be designed to apply vertical motion to the frame, or to provide an out-of-balance vibration in any plane including an eliptical motion if desired.

By virtue of the fact that the speed of vibration may be varied, the degree of agitation may be controlled, the greater agitation occurring as the vibrational speed is brought up toward the natural resonant frequency of the system. It should be noted that, if a suspension is provided wherein the spring rate may be varied, the degree of agitation can be controlled by varying the spring rate and/or the frequency of applied vibration.

Satisfactory separation occurs when the pot is in any position between vertical and that where the contents do not spill over the top. It has been found that the vibration with the pot in an angular position of about 45° to the vertical causes a very high degree of agitation which is believed to be due to the angular disposition of the walls of the pot and particularly the bottom wall. This is believed to be due to the angular position of the pot bottom, as well as its side walls which result in the application of angular forces to its content, although there may be other forces present which may not visually be observed. Although the vibratory structure is shown as being vibrated in a vertical direction, it is obvious that it could be designed to partake of an eliptical or other components of motion.

The dross pot sub-frame includes a platform base 24 suspended between a pair of upwardly extending side members 24a, a pair of trunnions 24b being secured to the members 24a above the lower ends and approximately in line with the tops of the dross pot support rails 24c on the plateform 24 and being journalled in pillow blocks 18i on the bottom of the channel member 18. Outriggers 18h extend laterally from the members 18 and have secured thereto tilt motors 30 which are connected to the trunnions 24b by couplings 24d. The tilt motors 30 may be of any reversible type but preferably are of the hydraulic type being reversibly controlled through the conduits 30a from a source of fluid pressure, not shown. As shown by the arrow in FIG. 1, they are arranged to rotate the trunnions 120°, this being optional since the motors may be arranged to rotate to a greater degree and in either direction. The tilting could be effected by using air or hydraulic cylinders.

The dross pot 34 is of heavy metal and seats on the rails 24c. It may be lined with a suitable refractory if desired. It is provided with a circumferential flange 34a near its upper end and is clamped against the rails and held by a pair of cam plates 36 disposed on a shaft 36a and operated by a lever 36b through the agency of hydraulic or air cylinders and pistons 38 carried on the uprights 24a. A tap hole is provided through a boss 34b on the bottom of the pot.

As best shown in FIG. 1, a mold 39 is disposed on a platform 40 spaced below the beam 16 in a position to receive the molten metal when the dross pot is titled.

As shown by the dashed lines 50, the apparatus, of the patent, as stated above, may be positioned to receive the dross when the pot is tilted to discharge the dross over the top edge.

One manner of operation is as follows: the dross pot is loaded with hot dross and placed in position on the rails 24c of the platform 24. Fluid pressure is admitted to the cylinders 38 to cause the cam plates 36 to be revolved and engage with the flange 34a on the dross pot and clamp the pot securely to the platform. The motor 29 is then energized and causes the rotary vibrators 27 to operate, vibrating the end 18d of the sub-frame 18, which motion is transmitted through the diverging arms 18c to the upper end of the vibratory frame. Preferably the vibration is started with the pot in a vertical position, and then it may be gradually tilted by the motor 30 to a position at about 45° from that shown in FIG. 1. At this time, the tap hole in the boss 34b in the bottom of the pot is opened and the molten metal escapes into the mold 39. The vibration with the pot at an angle of 45° has proven to be a position where very good molten metal separation takes place. Vibration is continued with the pot in this position which causes separation to take place fairly rapidly.

As previously stated, the vibration is believed to enhance the exothermic reaction, and by loosening the material and allowing the ingress of air, raising, or at least maintaining the temperature, and the combination causes the particles or globules of molten metal to coalesce and enhance the speed of their descension to the bottom of the container where they are tapped off. The operator can observe when the molten metal ceases to run out the tap hole and without stopping the vibration he may now tilt the pot further until the dross runs over the edge at a controlled rate. The operator is able to control the degree of agitation, as stated, which enables the dross to be preliminarily separated and deposited onto the apparatus 50, and provide a more even and controlled distribution of the dross on the conveyor, which materially enhances the subsequent efficiency and comminution thereof. The vibration also assists in preventing agglomeration of the dross in the pot during this period, although it does assist in the coalescing of the molten globules. The tilting of the pot may be continued until a position is reached (horizontal or 120°) where all the dross is discharged therefrom. The removal of the molten metal prior to decanting the dross onto the cooler and comminutor materially assists in the subsequent cooling and breaking up of the dross because there is less heat to be dissipated. It is also contemplated that the exothermic reaction may also be enhanced during the vibration by the addition of exothermic materials to increase the coalescing of the parent metal.

Having thus described the invention in an embodiment thereof, it is realized that numerous and extensive departures may be made therefrom without departing from the scope or aspect of the invention as defined in the appended claims.

We claim:

1. An apparatus for separating molten metal from dross and preventing agglomeration of the dross comprising a support, a frame resiliently mounted on the support and a sub-frame pivotally mounted on the frame, means connected between the frame and sub-frame for tilting the sub-frame, a dross and metal containing pot and means to hold said pot to the sub-frame.

2. An apparatus as described in claim 1 wherein means is provided for vibrating said frame.

3. An apparatus as described in claim 2 wherein the means for mounting the frame on the support is a spring means having a spring rate that may be varied to change the amplitude of vibration of the frame.

4. An apparatus as described in claim 2 wherein said frame is provided with an extension and said vibrating means is connected to said extension spaced from the pot.

5. An apparatus as described in claim 2 wherein said resilient means for mounting the frame mounts the frame from the support on opposite sides of said tilting means.

6. An apparatus as described in claim 4 wherein said extension, to which the vibrating means is connected, extends away from and opposite to said tilting means.

7. An apparatus as described in claim 4 wherein a receptacle is disposed below said pot on said support and said pot is provided with a bottom tap hole and said receptacle receives the molten metal from the pot.

8. An apparatus as described in claim 6 wherein said tilt means is arranged to selectively enable the pot to be tilted through an angle of at least 90°.

9. An apparatus as described in claim 7 wherein dross comminuting means is positioned near the metal receiving pot to receive the dross discharged from the top of the pot upon tilting of the pot and to comminute the dross so received.

10. A device as described in claim 1 wherein said frame comprises a pair of spaced apart horizontal side frame members and spring means is provided between each of said frame members and said support and each side frame is provided with a downwardly extending vertical member disposed intermediate the spring support means.

11. An apparatus as described in claim 10 wherein said downwardly extending members are tied together and vibrator means is connected thereto.

12. An apparatus as described in claim 11 wherein said vibrator means is a rotary vibrator.

13. An apparatus as described in claim 11 wherein said vibrator means comprises a pair of rotary vibrators disposed on the tying member in closely spaced relation to the ends thereof.

* * * * *